United States Patent [19]

Takano

[11] Patent Number: 5,012,077
[45] Date of Patent: Apr. 30, 1991

[54] CREDIT AND DEBIT CARD PROCESSING TERMINAL

[75] Inventor: Kimio Takano, Muko, Japan

[73] Assignee: Omron Tateisi Electronics Co., Kyoto, Japan

[21] Appl. No.: 250,553

[22] Filed: Sep. 29, 1988

[30] Foreign Application Priority Data

Oct. 7, 1987 [JP] Japan .................................. 62-253242

[51] Int. Cl.⁵ .......................... G06F 15/21; G06K 7/01
[52] U.S. Cl. .................................... 235/380; 235/379; 902/22
[58] Field of Search ............... 235/379, 380, 381, 383; 364/401, 405, 408; 902/4, 5, 22, 39

[56] References Cited

U.S. PATENT DOCUMENTS

| | | | |
|---|---|---|---|
| 4,625,276 | 11/1986 | Benton et al. | 902/39 |
| 4,650,978 | 3/1987 | Hudson et al. | 235/381 |
| 4,688,174 | 8/1987 | Sakamoto | 364/405 |
| 4,689,478 | 8/1987 | Hale et al. | 235/380 |
| 4,727,243 | 2/1988 | Savar | 235/380 |
| 4,782,217 | 11/1988 | Soza et al. | 235/380 |
| 4,839,504 | 6/1989 | Nakano | 235/379 |

FOREIGN PATENT DOCUMENTS 58-94077 6/1983 Japan .

*Primary Examiner*—Stuart S. Levy
*Assistant Examiner*—Robert Weinhardt
*Attorney, Agent, or Firm*—Dickstein, Shapiro & Morin

[57] ABSTRACT

A card to be used is first discriminated as to whether the card is a credit card or a debit card on the basis of data recorded on the card. In the case of a credit card, a necessary credit card processing including card authorization is effected. In the case of a debit card, a necessary debit card processing including immediate payment processing of an amount of money for transaction is efffected.

4 Claims, 4 Drawing Sheets

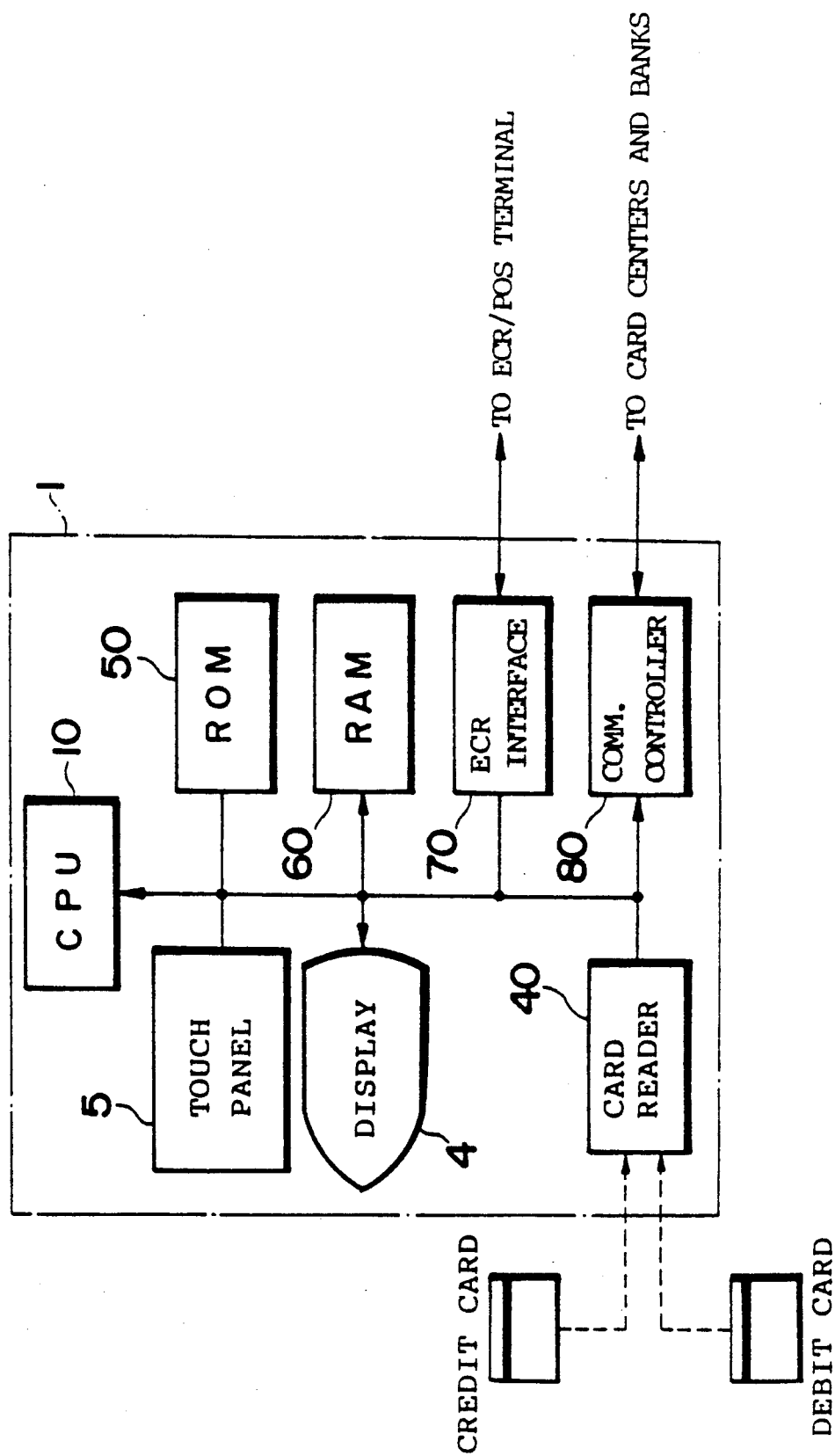

CREDIT AND DEBIT CARD PROCESSING TERMINAL

BACKGROUND OF THE INVENTION

1. Field of the Invention

The present invention relates to a card processing terminal suitable for use in distribution and money business industries and so on, and more specifically to a terminal for selectively processing both credit and debit card (or cash card) transactions.

2. Description of the Prior Art

In accompanying the spread of various cards such as credit cards, debit cards (cash cards), etc., is a demand for processing various transactions on the basis of cards without depending upon payment in cash. Commonly, a terminal for processing only credit card transactions and a terminal for processing only debit card transactions is installed independently at each shop or store in such a way that a credit card processing terminal is installed so as to face the operator and a debit card terminal is installed so as to face customers.

In the case of a credit card, an amount of money to be paid by a customer is loaned on credit, and the amount of money is settled within a predetermined time period (e.g. one month). Therefore, when a credit card is used at a store, an authorization by a central installation (i.e. host computer) is required to check whether the used card is valid and whether the amount of money for transaction exceeds an upper credit limit. Further, according to circumstances, an amount of money on credit is transmitted to the host computer to be stored in a memory for settlement. The above credit processing is mainly operated by an operator at each store.

In contrast with this, in the case of a debit card, an amount of money for transaction is settled whenever a transaction is made. Therefore, when a debit card is used at a store, an amount of money for transaction is paid through a central installation of a bank associated with the debit card by transferring an amount of money for transaction from the customer's account to the store's account. The above debit processing is mainly operated by a customer himself.

Conventionally, as described above, since it has been necessary to equip two, credit card and debit card, processing terminals at each store, there exists problems in that a large installation space is required and therefore the installation cost is high.

SUMMARY OF THE INVENTION

With these problems in mind, therefore, it is the primary object of the present invention to provide a credit and debit card processing terminal which can process both credit cards and debit cards in common.

In the credit and debit card processing terminal according to the present invention, a difference between credit and debit cards is first discriminated on the basis of data recorded on the card, and either one of credit or debit processing is effected on the basis of the discrimination result.

To achieve the above-mentioned object, the credit and debit card processing terminal according to the present invention comprises: (a) credit processing means for effecting a credit card processing on the basis of data stored on a credit card; (b) debit processing means for effecting a debit card processing on the basis of data stored on a debit card; (c) card discriminating means for discriminating whether a card to be used is a credit card or a debit card by reading data recorded on the card; and (d) processing activating means for activating any one of said credit processing means and said debit processing means in response to data discriminated by said card discriminating means.

According to the present invention, since the kind of card is first discriminated by reading data recorded on each card and then required transaction processing means is activated on the basis of the discriminated data, it is possible to effectively process each card transaction without designating the kind of card transaction processing. Further, since a single terminal can be used in common for both card transactions, it is possible to reduce the terminal installation space at each store.

BRIEF DESCRIPTION OF THE DRAWINGS

FIG. 3 is a schematic block diagram showing the electric system configuration of the terminal;

DETAILED DESCRIPTION OF THE PREFERRED EMBODIMENTS

Figure 1:
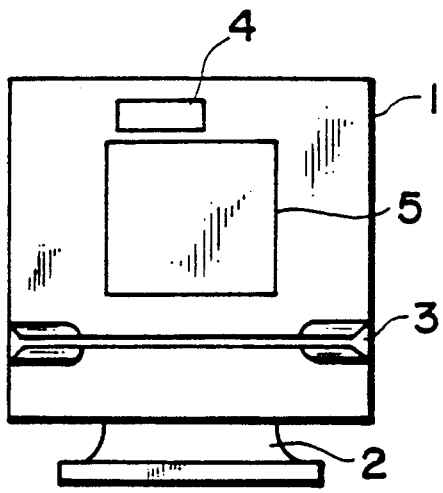
FIG. 1 is a front view showing a credit and debit card processing terminal according to the present invention.

With reference to FIG. 1, a terminal 1 is supported on a support base 2 so as to be rotatable horizontally. The terminal 1 is formed with a card reader slot 3 at the lower part of the terminal, by which data on a credit card or debit card can be read when a card is inserted thereinto. Since the terminal 1 is rotatably supported on the base 2, the front surface of the terminal is turned toward the operator in the case of credit card processing (however, turned toward the customer when a secret number is entered), but toward the customer in the case of debit card processing. On the upper side of the terminal 1, a display 4 is provided, and a touch panel 5 composed of a plurality of transparent touch keys is disposed at the center of the terminal 1. On the display 4, numerical data entered by depressing key switches of the touch panel 5, an amount of money for transaction transmitted from an ECR or POS terminal which is connected to the terminal 1, the authorization results of a credit card, etc. are all displayed.

The touch panel 5 includes a plurality of alphanumeric character keys and some function keys (sixteen keys at its maximum in this embodiment). These alphanumeric character keys and function keys change in arrangement or in function on the basis of commands corresponding to the kind of transaction processing so as to provide a key entry arrangement suitable for the required processing.

Figure 2A:
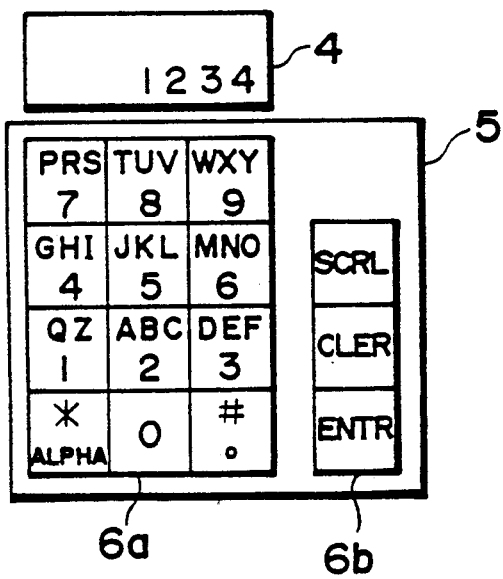
FIG. 2a is an enlarged view showing a touch panel used for credit card processing.

In the case of credit card processing, as shown in FIG. 2a, two groups of keys 6a and 6b are displayed. By using these keys, various data can be entered. For instance, it is possible to enter various data such as a telephone number of a central installation for credit card transaction, a secret number, etc. by depressing these alphanumeric character key switches 6a. By use of these key switches 6a, alphabetic letters can be entered. To enter P, an "ALPHA" key is depressed once and then an alphanumeric key 7 is depressed. To enter R, the "ALPHA" key is depressed twice and then the alphanumeric key 7 is depressed. To register a telephone number, a "*" key is used. The key switches 6b are function keys. An "ENTR" key is used to enter a numerical data after the data has been confirmed on the display; a "CLER" key is used to clear an entered data for correction; and a "SCRL" key is used to display a data which has been displayed beyond the displayable area for scroll display. For instance, a message indicative of card authorization results is too long and therefore not displayed in a whole, it is possible to shift the message by depressing this "SCRL" key.

Figure 2B:
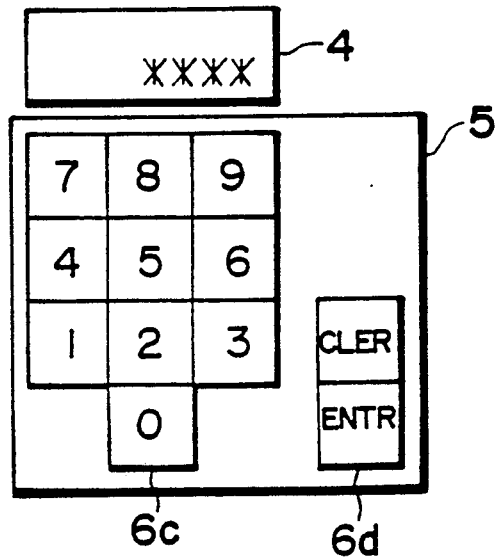
FIG. 2b is an enlarged view showing a touch panel used for debit card processing.

On the other hand, in the case of debit card processing, as shown in FIG. 2b, two groups of keys 6c and 6d are displayed. The key switches 6c are numeric character keys and are used to enter a secret number of a debit card. The key switches 6d are function keys. An "ENTR" key is used to enter a data after the data has been confirmed on the display; a "CLER" key is used to clear an entered data for correction; and no "SCRL" key is displayed because this key is unnecessary in this debit card processing. As described above, since only necessary numerical keys and function keys are displayed in debit card processing, it is possible to simplify the key arrangement.

FIG. 3 is a schematic block diagram showing the system configuration of one embodiment of the terminal of the present invention. In the drawing, the credit and debit card processing terminal 1 is provided with a CPU 10 connected to an ECR or POS terminal via an interface 70, to receive various data such as the sum total of money for purchase for each customer, especially the sum total amount sold to be handled as credit or debit, etc. Further, the CPU 10 is connected to credit card centers through a communications controller 80 via a telephone line to effect credit card authorization in credit card processing and to host computers of banks through the same controller 80 via a telephone line to effect money settlement in debit card processing. This communications controller 80 provides an automatic dialing function on the basis of a telephone number entered through the touch panel 5, registered as a registered dial number or stored in a memory (RON or RAM). Further, a handset is provided for the terminal where necessary.

Further, to the CPU 10, there are connected a ROM 50 for storing various programs, a RAM 60 for storing various data during transaction processing, the touch panel 5, the display 4, and a card reader 40 for reading data recorded on a credit card or debit card.

The credit card or debit card is usually a magnetic card; however, it is also possible to use an IC card, an optical card, etc. On the credit card, a credit company name, a code indicative of the kind of credit card, a member code of its owner, etc. are recorded. On the debit card, a bank name of its owners account, an account number of the owner, etc. are recorded.

Figure 4:
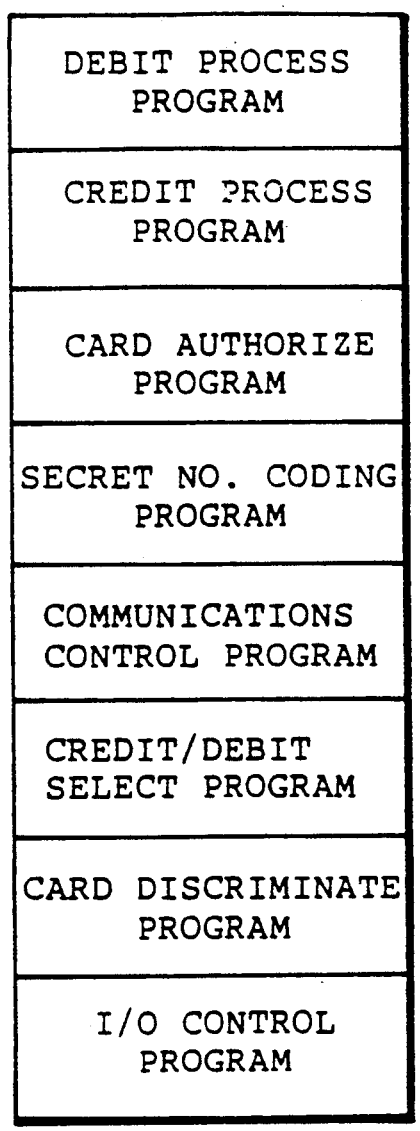
FIG. 4 is an illustration for assistance in explaining the contents of a ROM shown in FIG. 3.
Figure 5:
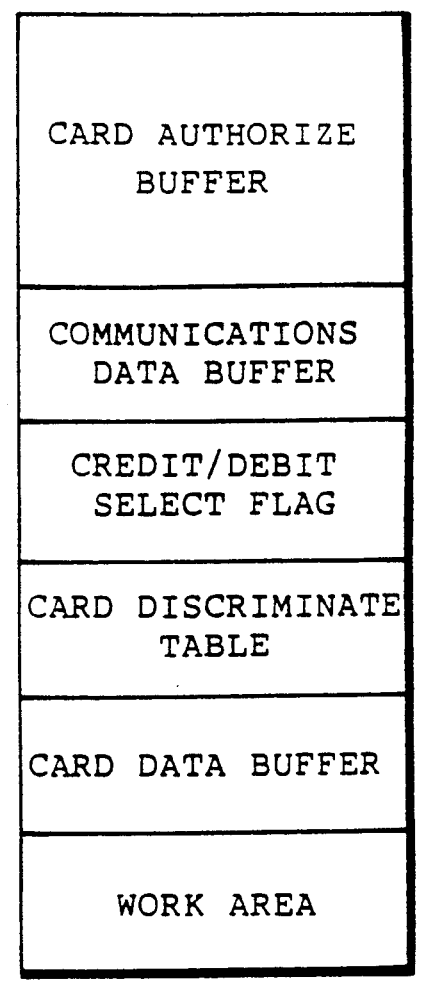
FIG. 5 is an illustration for assistance in explaining the contents of a RAM shown in FIG. 3.

FIG. 4 shows the memory contents of the ROM 50 shown in FIG. 3, and FIG. 5 shows the memory contents of the RAM 60 shown in FIG. 3.

With reference to these drawings, various programs necessary for discriminating the kinds of card, effecting credit processing and debit processing, etc. are stored in the ROM 50. On the other hand, various buffer (internal memory areas) necessary for data processing, a card discriminating table, etc. are stored in the RAM 60. Credit company names corresponding to credit cards to be used, codes indicative of the kinds of credit cards, bank codes corresponding to debit cards to be used, etc. are stored in the card discriminating table. These data are compared with data read from a credit card or debit card through the card reader 40 to determine whether a card passed through the card reader 40 is a credit card or a debit card in accordance with the card discrimination program.

Figure 6:
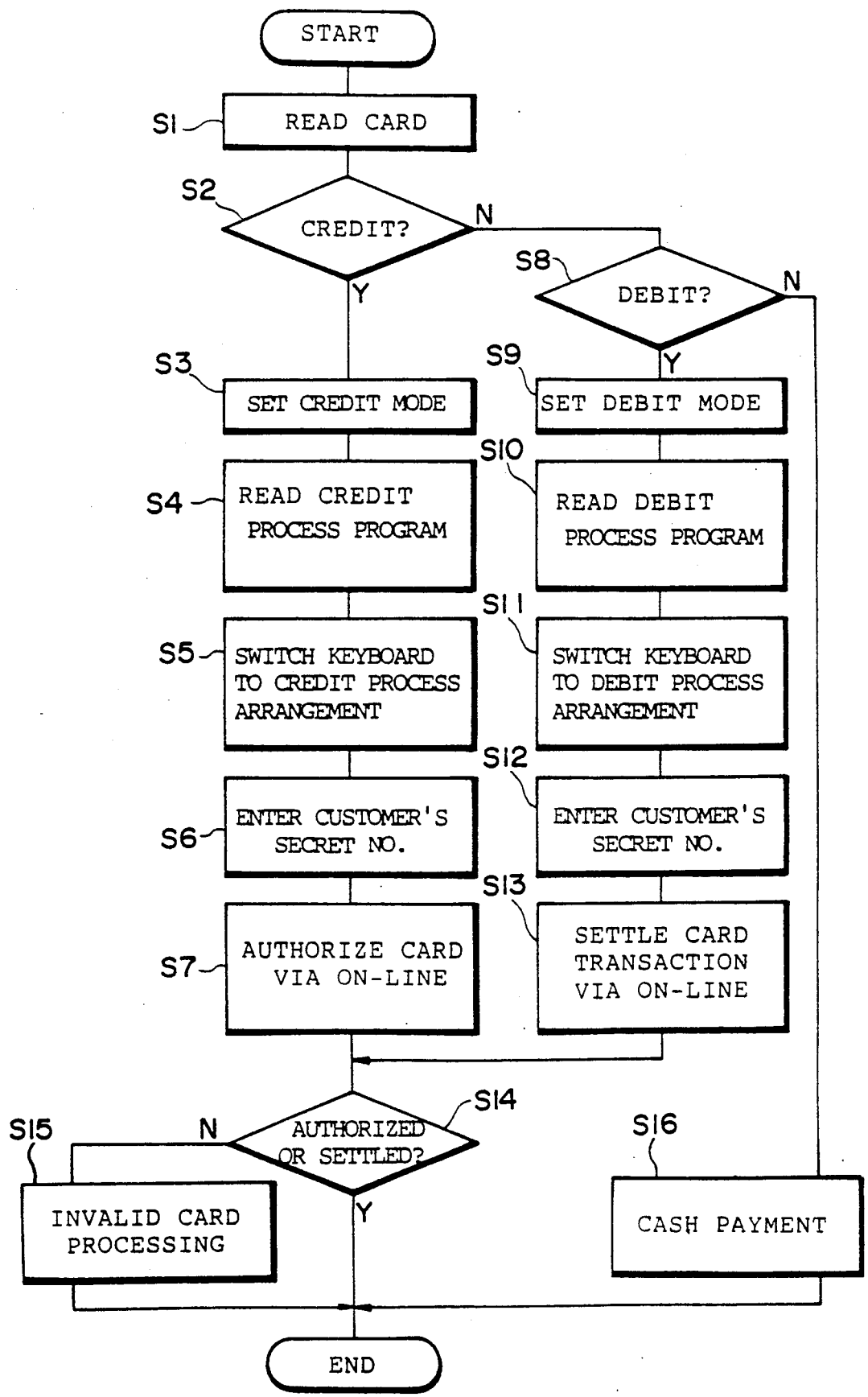
FIG. 6 is a flowchart for assistance in explaining the operation of the terminal of the present invention.

The processing operation of the terminal 1 will be described with reference to a flowchart shown in FIG. 6.

At a store, a card handed by a customer is entered into the card reader slot 3 to read data recorded thereon (in step S1). The CPU 10 discriminates whether the card is a credit card or a debit card on the basis of the data read by the card reader 40 in accordance with the card discriminating program. In the case of a credit card, in general the card is handed from a customer to the operator, and the operator inserts the card into the card reader slot 3. In the case of a debit card, the customer himself inserts the card into the slot 3.

If the CPU 10 determines that the card is a credit card (in step S2), the terminal 1 is set to the credit mode (in step S3). Here, if the CPU 10 has previously read the debit processing program, the CPU 10 activates the credit/debit selecting program to read the credit processing program (in step S4). Thereafter, the credit processing program is executed to switch the keyboard arrangement in the touch panel 5 to an arrangement suitable for credit processing as shown in FIG. 2a (in step S5).

A customer enters a secret number by use of the key switches 6a and 6b on the touch panel 5 to execute credit processing (in step S6). Further, the operator enters a telephone number of a central (host) computer corresponding to the credit card by use of the key switches 6a and 6b so that the terminal 1 is connected to the host computer via a telephone line. However, where a telephone number corresponding to the credit company code is stored in the memory, this telephone number is automatically read from the memory and the terminal 1 is automatically connected to the host computer via the communications controller 80. The entered secret number is coded in accordance with the secret number coding program, and then transmitted via the communications controller 80 to the host computer of the credit company together with the already-read credit card data (a member code, etc.), in order to check whether transaction by the credit card is permissible (e.g. authorization) (in step S7). That is, the card is checked as to whether the card does not correspond to registered invalid cards. Further, since an amount of money for transaction is transmitted from an ECR or POS to the terminal 1 and displayed on the display 4, this amount of money is also transmitted to the host computer to check whether the total amount of money on credit is less than an upper credit limit for the customer.

The authorization results transmitted from the host computer are received by the terminal 1 via the communications controller 80 and displayed on the display 4. On the basis of the displayed results, the operator knows whether the transaction by a credit card is permissible or not. On the other hand, the CPU 10 of the terminal 1 executes the credit card transaction processing when the CPU determines that the credit card transaction processing is permissible in accordance with the card authorization program (in step S14). That is, the credit card transaction is realized when the credit card data and the transaction amount are stored in the memory of the terminal 1 or of the host computer.

If, however, the CPU determines that the credit card transaction is not permitted, the operator requests the customer to pay in cash (e.g. cash transaction) (in step S15). Further, in the case of credit card transaction, an entry of a secret number is not necessarily required.

On the other hand, when the CPU discriminates that the card is a debit card on the basis of the data read by the card reader 40 in accordance with the card discrimination program (in step S8), the terminal 1 is set to the debit mode (in step S9). The debit card is usually inserted into the card reader slot 3 by the customer himself. Here, if the CPU 10 has previously read the credit processing program, the CPU 10 activates the credit/debit selecting program to read the debit processing program (in step S10). Thereafter, the debit processing program is executed to switch the keyboard arrangement in the touch panel 5 to an arrangement suitable for debit processing as shown in FIG. 2b (in step S11).

The customer enters a secret number of the debit card by use of the key switches 6c and 6d (in step S12). Since telephone numbers of the center (host) computers of the banks corresponding to bank codes are stored in the memory, a telephone number of a host computer of a bank is read from the memory on the basis of a bank code recorded on the read debit card. Therefore, this telephone number is automatically dialed to connect the terminal 1 to the host computer via the communications controller 80.

The entered secret number is coded in accordance with the secret number coding program and then transmitted to the bank host computer via the communications controller 80 in accordance with the communications control program, together with card data recorded on the debit card, an amount of money for transaction transmitted from an ECR or POS and displayed on the display 4, and a store's account number stored in the memory, for executing debit card settlement (in step S13). That is, the debit card settlement can be attained when an amount of money to be paid is transferred from the customer's account to the store's account in the bank host computer.

After the transaction has been settled, a message indicative of settlement end is transmitted from the host computer to the terminal (in step S14) and the program control ends. However, in case a message indicative of no settlement is transmitted from the host computer to the terminal 1 because the balance at the customer's account is lower than the amount of money for transaction or the debit card is invalid, this message is displayed on the display 4. In this case the operator requests the customer to pay in cash.

Further, when the customer wants to pay in cash without requesting the credit or debit card transaction, an ordinary cash payment is made (in step S16).

In the above embodiment, although the display is not included in the touch panel as shown in FIG. 1. However, it is of course possible to incorporate the display in the touch panel. Further, in the above embodiment, only a single card reader slot is provided as shown in FIG. 1. However, it is of course possible to provide two, credit and debit, card reader slots for the terminal. In this case, it is possible to discriminate whether the card is a credit card or a debit card on the basis of the slot into which the card is inserted.

I claim:

1. A credit and debit card processing terminal, comprising:
   a processor comprising a credit processor for effecting credit card processing on the basis of data stored on a credit card and a debit processor for effecting debit card processing on the basis of data stored on a debit card;
   (b) a card discriminator for automatically discriminating whether a card to be used is a credit card or a debit card by reading said data stored on said card; and
   (c) a processing activator for activating any one of said processors in response to said data automatically discriminated by said card discriminator.

2. The credit and debit card processing terminal of claim 1, wherein said credit processor and said debit processor includes key input means.

3. The credit and debit card processing terminal of claim 2, wherein said key input means comprises a transparent touch panel including a character key area and a function key area, wherein both said key areas have a key input arrangement that is changeable from a first key input arrangement for said credit processor to a second key input arrangement for said debit processor according to said data automatically discriminating by said card discriminator.

4. A card processing system having a touch panel comprising:
   (a) a processor for effecting card processing on the basis of different types of information on said card;
   (b) a discriminator for automatically discriminating between types of cards on the basis of said information on said cards;
   (c) a processing activator for activating types of transactions depending on types of information automatically discriminated by said card discriminator; and
   (d) a touch panel controller for changing key arrangements according to said card information discriminated by said discriminator.

* * * * *